United States Patent [19]

Blane et al.

[11] 3,828,140

[45] Aug. 6, 1974

[54] CALLING LINE IDENTIFICATION SYSTEM

[75] Inventors: Leslie Lewis Blane, Rumson; Kenneth Charles Bottonari, Madison Township; Edward Earl Lewis, Middletown, all of N.J.

[73] Assignee: Bell Telephone Laboratories Incorporated, Murray Hill, N.J.

[22] Filed: Dec. 22, 1972

[21] Appl. No.: 317,635

[52] U.S. Cl. ........................ 179/18 FH, 179/27 DB

[51] Int. Cl. ........................................ H04m 1/56

[58] Field of Search ............. 179/5.5, 18 FH, 27 DB

[56] References Cited

FOREIGN PATENTS OR APPLICATIONS

| | | | |
|---|---|---|---|
| 656,214 | 8/1951 | Great Britain | 179/27 DB |
| 704,039 | 2/1954 | Great Britain | 179/27 DB |

*Primary Examiner*—Kathleen H. Claffy
*Assistant Examiner*—C. T. Bartz
*Attorney, Agent, or Firm*—D. A. Marshall

[57] ABSTRACT

A calling line identification system arranged for identifying calling ones of a number of telephone stations connectable through the telephone switching network with remotely located called telephone stations. A called party starts the identification sequence by coupling the incoming transmission path of a calling telephone station with the calling line identification system and transmitting an initiate identity signal thereto. The initiate identity signal enables the calling line identification system to sequentially remove groups of the telephone stations from across their line facilities and simultaneously apply bursts of distinctive tone signals to each opened line facility. Ones of the tone signals received over the incoming transmission path enable the calling line identification system to effect an identity of an anonymous calling telephone station connected with the remote called telephone station.

15 Claims, 6 Drawing Figures

PATENTED AUG 6 1974

3,828,140

CALLING LINE IDENTIFICATION SYSTEM

BACKGROUND OF THE INVENTION

1. Field of the Invention

This invention concerns telephone systems. I particular, it relates to an arrangement for locally identifying calling telephone stations placing calls through the telephone switching network to remotely located called telephone stations.

2. Description of the Prior Art

In telephone systems, and particularly automatic telephone systems, it is sometimes desirable to identify certain telephone stations connected through the telephone switching network with called telephone stations. For example, attendants serving customer telephone switching systems occasionally receive anonymous calls threatening harm to company personnel and property. In these cases, such as ones involving bomb threats, the need arises for determining the identity of a calling telephone station coupled with a called attendant position. While various expedients have been used in the past for tracing calls, these expedients lack certain features incorporated within the present invention.

Many prior art arrangements have been disclosed for identifying calling telephone stations connected with called telephone stations and attendant positions. For example, the telephone switching network, hereinafter referred to as the telephone direct distance dialing network, employs in many areas centralized automatic message accounting systems wherein operators simply ask for the directory numbers of calling telephone stations coupled with operator positions. Obviously, this procedure is inappropriate for use in identifying telephone stations utilized for originating threatening telephone calls.

Additional systems have been disclosed for enabling the identification of calling telephone stations placing nuisance calls to called telephone stations. These types of systems oftentimes require that the called party place special signals on the nuisance call transmission path extending through the telephone direct distance dialing network to the switching office serving the calling telephone station. The special signals activate call tracing apparatus at the serving switching office for automatically identifying the switching equipment engaged in the establishment of the nuisance call. Since transmission paths, especially those transmission paths between telephone switching offices, are generally limited to the transmission of signals in the audible range of the human ear, unique precautions must be taken so that the special tracing signals do not alert the calling party.

Some of the prior art identification systems are arranged to identify a calling telephone station by placing ringing and noise signals on the transmission path toward the calling station. These types of signals cause problems in that ringing signals can only be employed before a called party answers and that background noise may interfere with the called party generated noise signals. Other prior art identification systems are arranged to identify a calling telephone station by means of special signals applied to a separate signal path uniquely associated with a transmission path established through a switching office. Since the signal path is not extended to the calling telephone station, the calling party is not aware of the special signal being used to identify the calling telephone station number. The signal path, in addition to not being extended to the calling station, is not provided between switching offices of the telephone direct distance dialing network. Thus, apparatus must be provided to transmit the special signal between and through those switching offices utilized in the establishment of the nuisance call transmission path.

A need exists in the art for a system arranged to identify a calling telephone station coupled through the telephone direct distance dialing network with a called telephone station without alerting a calling party that the calling telephone station is being identified. A need also exists for a system arranged for utilizing the transmission paths of calling telephone stations to effect the identity of calling stations without signaling the calling party to initiate a disconnect before the calling telephone station can be identified.

SUMMARY OF THE INVENTION

In the exemplary embodiment of the invention, apparatus is provided for identifying one of a plurality of telephone stations utilized for placing a call through the telephone direct distance dialing network to called attendant positions of customer telephone switching systems.

A called attendant initiates the identification sequence by enabling the identifying apparatus and coupling the transmission path of a calling telephone station thereto. The attendant enabled identifying apparatus sequentially disconnects groups of the telephone stations from their associated transmission paths and momentarily applies bursts of distinctive tone signals to each opened transmission path. Ones of the tone signals received over the calling station transmission path coupled with the identifying apparatus direct the identifying apparatus to effect an identity of the calling telephone station.

In accordance with one feature of the invention, the identifying appatatus is arranged to momentarily disconnect groups of telephone stations from their respective switching office line facilities and simultaneously connect each group of the opened line facilities with predetermined ones of a plurality of distinctive tone signal generators.

In accordance with another feature of the invention means are incorporated within the identifying apparatus for utilizing a first received tone signal to identify a group of the plurality of telephone stations wherein a calling telephone station is located. These means, responding to the first received tone signal, enable the identifying apparatus to connect each opened line facility of the identified group of telephone stations with one of the plurality of tone signal generators.

In accordance with still another feature of the invention means are incorporated within the identifying apparatus, and responsive to a second received tone signal, for identifying the calling one of a group of telephone stations that is individually connected through the telephone direct distance dialing network with a called telephone station.

It is a further aspect of our invention that the attendant, upon recognizing that it is desirable to obtain an identification of the calling station, operates an alarm key which completes a loop from the transmission line incoming to the attendant back to the calling line identifying apparatus, whereby the tones momentarily applied to the transmission line facility of the calling telephone can be detected back at the line identifying apparatus. Further, in accordance with this aspect of our invention, the completion of this loop is recognized by the line identifying apparatus and initiates the other operations involved in the detection of the calling line.

DESCRIPTION OF THE DRAWING

The foregoing features and advantages, as well as others, of the invention will be more apparent from the following detailed description, together with the drawing, in which.

Figure 1:
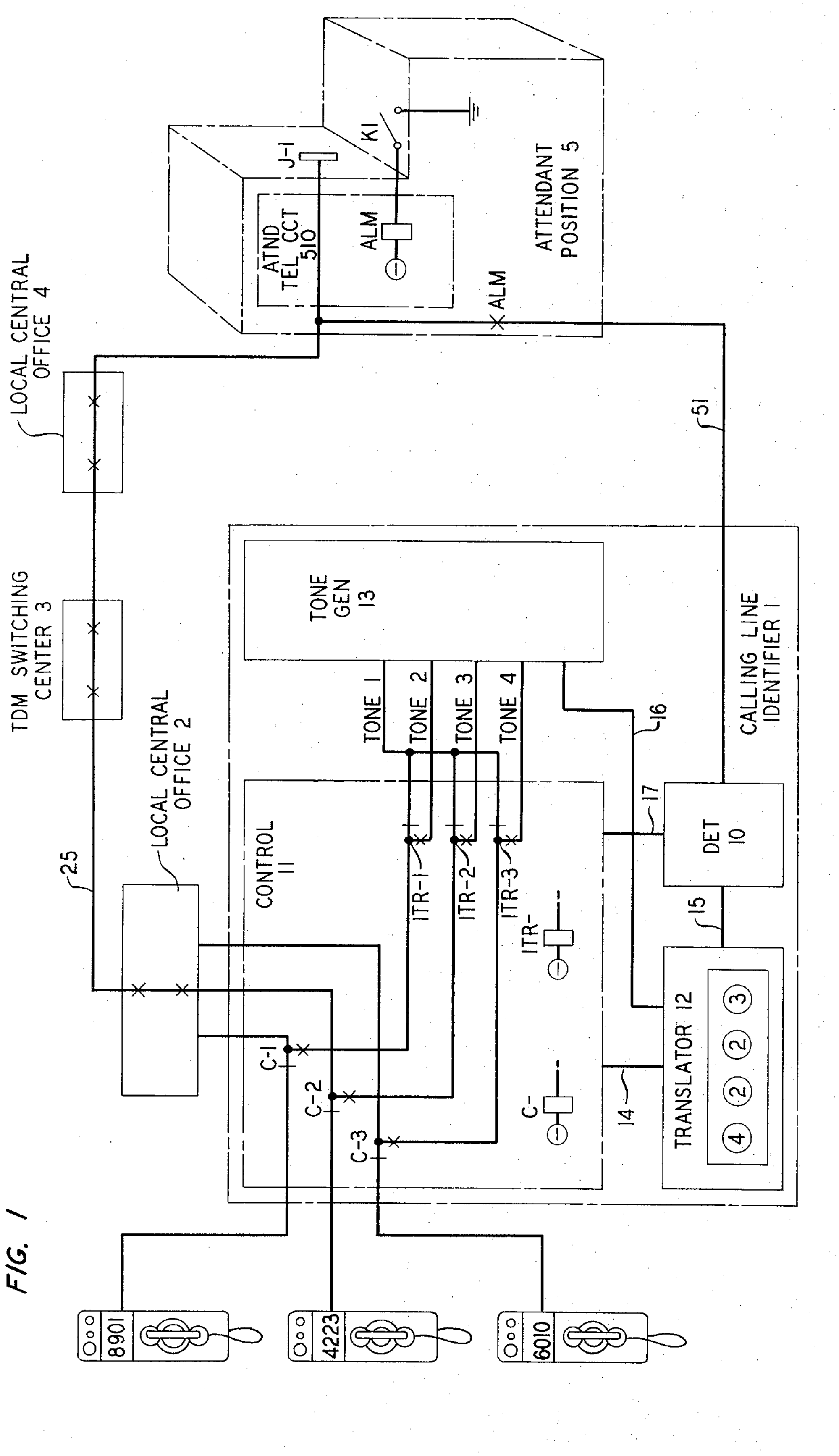
FIG. 1 shows schematically the relationship of the basic individual circuits which comprise an illustrative embodiment of the invention.

It will be noted that the Figures of the drawing employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached Contact-Type Schematic Circuit Drawing" by F. T. Meyer in the September 1955 publication of the American Institute of Electrical Engineers Transactions, Communications and Electronics, Volume 74, pages 505–513.

GENERAL DESCRIPTION

Referring now to FIG. 1 of the drawing, it is intended that the transmission line facilities of a plurality of telephone stations, such as telephone stations 8901, 4223, and 6010, be coupled with calling line identifier 1. Calling line identifier 1 is arranged so that each telephone station transmission line facility is extended through the break portion of normally released C- relay transfer contacts to switching central offices of the telephone direct distance dialing network, such as local central office 2. Assuming that a calling party located at telephone station 4223 desires to place a call to an attendant located at attendant position 5, a connection is established from telephone station 4223 through the break portion of transfer contacts C-2 over transmission path 25 extending through local central office 2, tandem switching center 3, and local central office 4 to attendant telephone circuit 510 of called attendant position 5.

The attendant of called attendant position 5 is able to initiate a sequence for effecting an identity of an anonymous calling telephone station coupled with attendant telephone circuit 510 by operating key K1. Operation of key K1 enables alarm relay ALM to couple transmission path 25 with transmission path 51 and to initiate and transmit an identity signal over transmission path 51 to calling line identifier 1. Detector 10 of calling line identifier 1 responds to the received initiate identity signal by enabling control 11 to momentarily operate relay C- and thereby remove the group of telephone stations 8901, 4223, 6010 at the break portion of transfer contacts C-1, C-2, C-3 from across their respective transmission line facilities. Simultaneously with the operation of the C- relay, tone generator 13 applies tone signal 1 to the group of opened transmission line facilities through the make portion of the C-1, C-2, and C-3 and the break portion of the 1TR-1, 1TR-2, and 1TR-3 transfer contacts.

Tone signal 1 is transmitted over the opened transmission line facilities associated with telephone stations 8901, 4223, and 6010 to local central office 2. At local central office 2 the tone signal appearing on the transmission line facility of calling telephone station 4223 continues over transmission path 25 to called attendant position 5. Tone signal 1 is returned by called attendant position 5 through the make contacts of operated relay ALM and over transmission path 51 to detector 10 of calling line identifier 1. Receipt of tone signal 1 enables detector 10 to initiate a sequence to operate relay 1TR- and thereby identify the group of telephone stations wherein calling telephone station 4223 is located.

Operation of the 1TR- relay removes tone signal 1 from the telephone line facilities of telephone stations 8901, 4223, 6010 and connects tone signals 2, 3, and 4 of tone generator 13 individually to the previously opened telephone line facilities by means of the make portions of transfer contacts 1TR-1, 1TR-2, 1TR-3, respectively. Tone signal 3 applied to the opened telephone line facility of telephone station 4223, via make portion of transfer contacts 1TR-2 and C-2, is transmitted over transmission path 25 through attendant position 5 and return transmission path 51 to calling line identifier 1. The receipt of tone signal 3 enables detector 10, in combination with the C- and 1TR- relays of control 11, to direct translator 12 to obtain the identification or directory number of calling telephone station 4223.

In summary, calling line identifier 1 is arranged to identify an unknown one of a plurality of telephone stations connected through the telephone direct distance dialing network with a called telephone station by opening groups of the telephone station line facilities and applying bursts of tone signals thereto. The bursts of tone signals appearing on the unknown calling telephone station transmission path are returned by the called telephone station to calling line identifier 1, and utilized by calling line identifier 1 to effect an identity of the calling telephone station.

DETAILED DESCRIPTION

Figure 2:
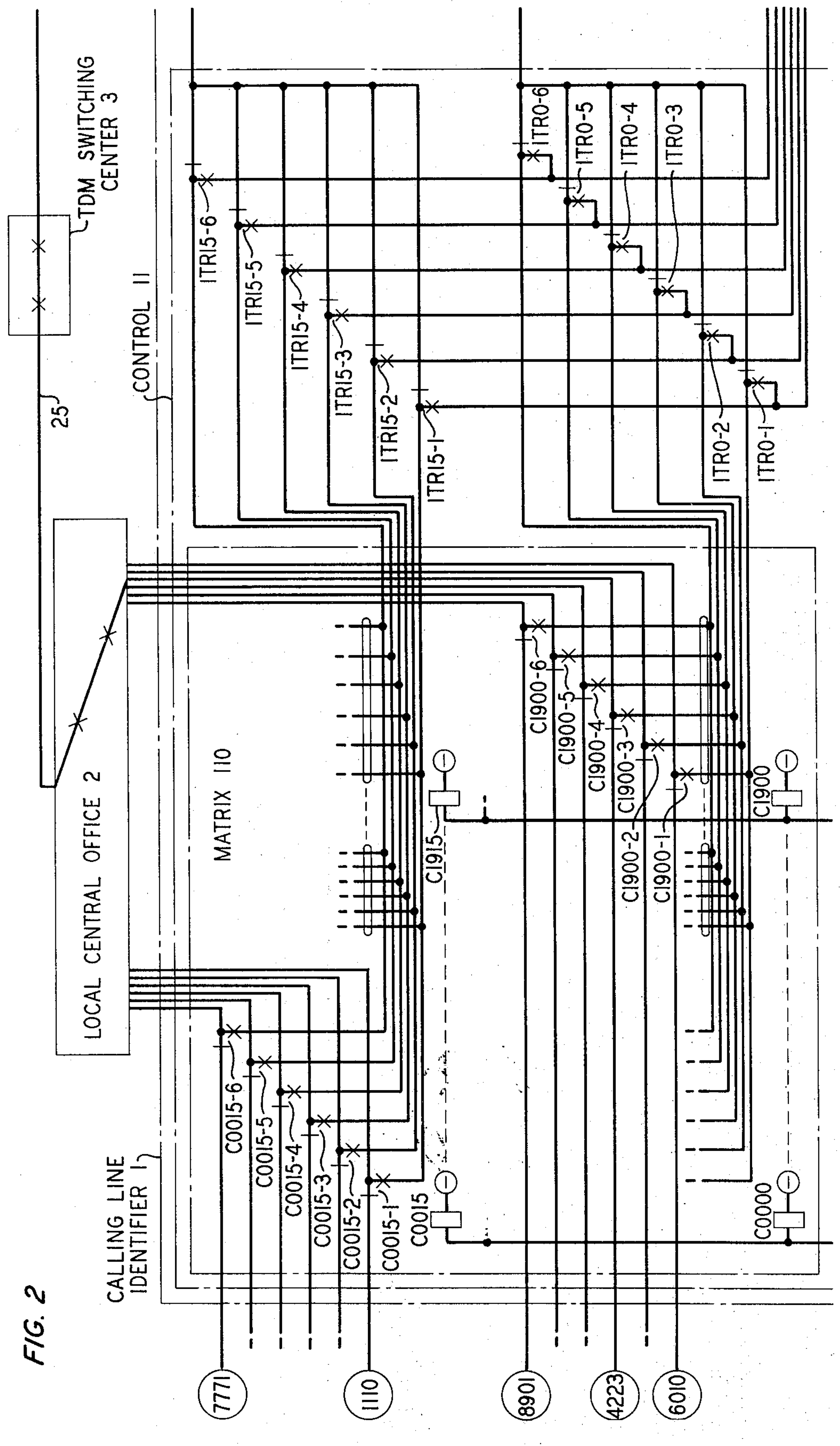
FIGS. 2 through 5, when arranged in accordance with FIG. 6, set forth a partially schematic representation of a calling line identification system embodying the principles of the present invention.

Referring now to FIG. 2 of the drawing, it is intended that control 11 of calling line identifier 1 be comprised of a plurality of relays arranged in the wellknown format of a matrix. Thus, matrix 110, for the present embodiment of the invention, is assumed to be comprised of 320 relays arranged in 20 vertical columns of 16 relays each. All of the relays assigned to a column, for example, relays C0000 through C0015, have one side of a winding connected to battery and the other side connected to a common vertical lead, such as lead C00, extending to vertical stepper 111 of FIG. 4. Each matrix relay, FIG. 2, has a number of transfer contacts common to a group of the plurality of telephone stations served by calling line identifier 1.

The line facilities comprising the tip and ring conductors of a group of telephone stations, such as 7771 and 1110, are individually connected through the break portion of matrix relay C0015 transfer contacts C0015-1, -2, -3, -4, -5, and -6 with serving telephone local central office 2. Similarly, another group of telephone stations 8901, 4223, 6010, and their respective line facilities are connected through the break portion of the C1900 relay transfer contacts C1900-1, -2, -3, -4, -5, and -6 to local central office 2.

A calling party located at telephone station 4223 and desiring to place a call to a particular called telephone station, such as attendant position 5, establishes a call connection in the well-known manner over a path extending through the break portion of transfer contacts C1900-3 to local central office 2. Local central office 2 responds to digits dialed by the calling party and extends the call connection of telephone station 4223 over transmission path 25 through tandem switching center 3 and local central office 4, FIG. 3, of the telephone direct distance dialing network to a called telephone station herein designated attendant position 5.

Formerly, an attendant serving a called attendant position of a customer telephone switching system was not provided with apparatus for identifying a calling telephone station coupled through an incoming transmission path with attendant position telephone circuit. If during the course of conversation the attendant, serving attendant position 5 of the present invention, desires to obtain the number identity of a telephone station utilized by an anonymous calling party, the closing of key K1 will enable relay ALM to initiate an identify sequence. The closing of key K1 operates relay ALM, which locks operated to ground through make contacts ALM-4, normally released key K2, and break contacts 1E1-1, to close make contacts ALM-2 and ALM-3 for the purpose of bridging the T and R conductors of transmission path 25 across the primary of transformer RC1. In addition, the operation of relay ALM closes make contacts ALM-1 to apply a battery signal to lead M1 of signal unit EM1 in order that an initiate identify signal may be transmitted over the T1 and R1 conductors of transmission path 51 to calling line identifier 1. Signal units EM1 and EM2, FIG. 5, comprise the well known duplex E and M lead signaling system wherein a battery signal transmitted over an M lead is received as a ground signal on the E lead.

Figure 4:
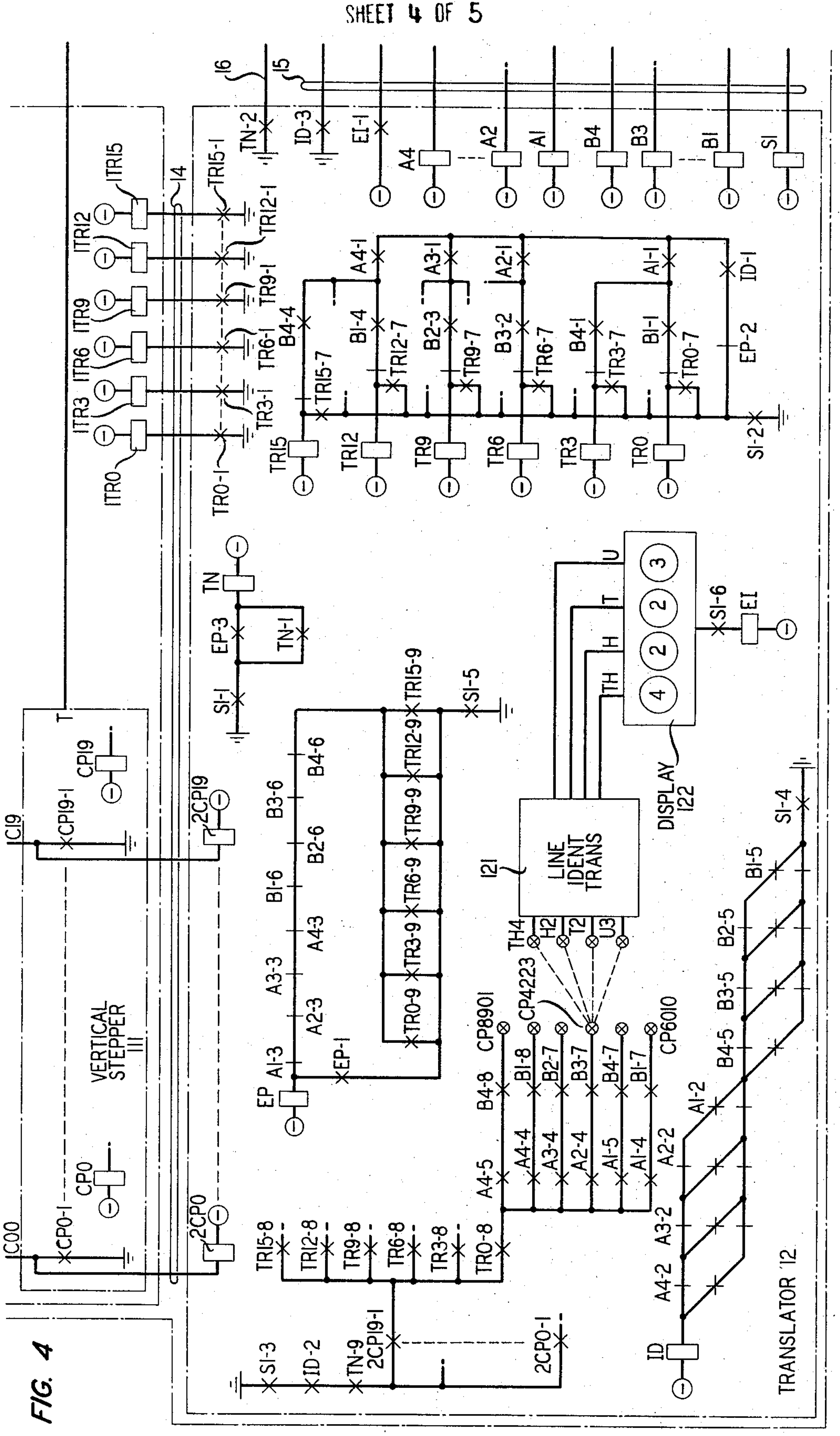
Figure 6:
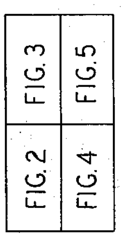
Figure 5:
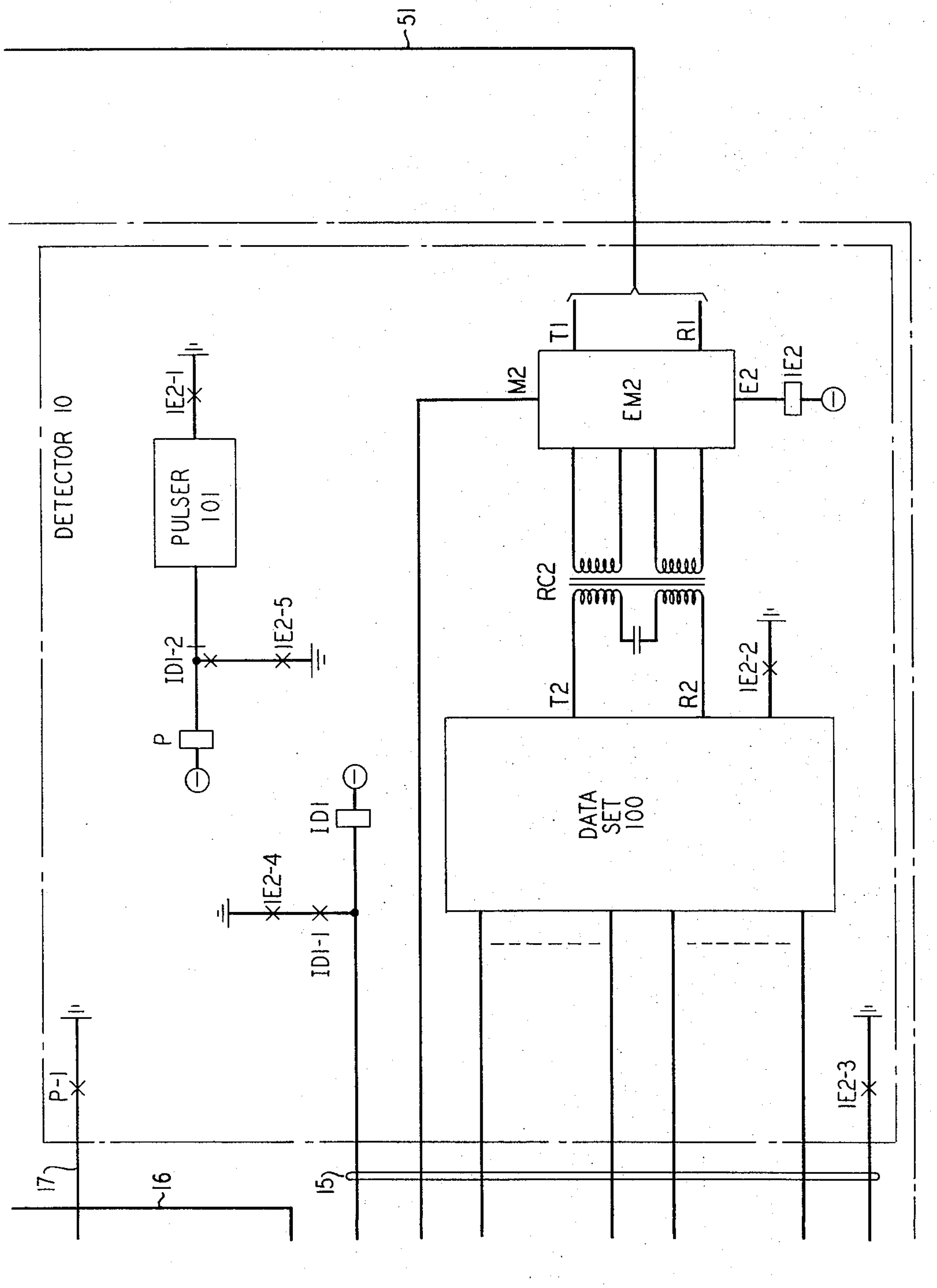

Referring now to FIG. 5 of the drawing, the battery signal applied to the M1 lead and transmitted over the T1 and R1 conductors of transmission path 51 appears as ground on lead E2 to operate start relay 1E2 of detector 10. Operation of relay 1E2 closes make contacts 1E2-1, -2, and -3 to apply ground signals to pulser 101, data set 100, and a lead of conductor cable 15 extending to translator 12. The ground applied through make contacts 1E2-2 enables data set 100 to respond to subsequent tone signals received over conductors T2, R2 and, in the well-known manner, translate two of 16 possible incoming frequency signals comprising the received tone signals into ground signals that are selectively placed on two of eight output leads. Ground applied through make contacts 1E2-3 operates relay S1, FIG. 4, of translator 12 via a lead of conductor 15.

Pulser 101, any one of a variety of pulsing circuits well known in the art, responds to the ground signal appearing through operated make contacts 1E2-1 by generating a continuous train of output ground pulses, each approximately 100 milliseconds in length. These output pulses are applied through the release portion of transfer contacts ID1-2 to operate pulsing relay P. The periodic closing of make contacts P-1 places ground over an obvious path to the T input of vertical stepper 111, FIG. 4, of control 11. Vertical stepper 111 is arranged in the well-known manner so that a first ground pulse appearing on input T causes the operation of vertical stepping relay CPO during the interval immediately following the first pulse. Subsequent ground pulses sequentially operate one of the vertical stepping relays CP1, not shown, through CP19.

Operation of first vertical stepping relay CPO closes make contacts CPO-1 to apply ground over vertical lead C00 extending from translator 12 to matrix 110, FIG. 2. The ground appearing on vertical lead C00 operates the 16 vertical column relays C0000 through C0015 of matrix 110. Each of the vertical column relays, for example, relay C0015, operates associated transfer contacts C0015-1, -2, -3, -4, -5, -6 and thereby removes a group of six telephone stations, such as telephone stations 7771 and 1110, from across their respective line facilities. In addition, the make portion of transfer contacts C0015-1, -2, -3, -4, -5, -6 connects the line facilities of the group of telephone stations to a common source of tone signals. Thus, the line facilities of telephone stations 1110 and 7771 are connected, via the make portion of operated transfer contacts C0015-1, -6 and the break portion of released transfer contacts 1TR15-1, -6, respectively, to oscillator 15, FIG. 3, of tone generator 13 through break contacts 1TN-15.

Tone generator 13 is comprised of 16 oscillators, herein designated OSCO through OSC15. Each oscillator is arranged in the well-known manner to generate a tone signal comprised of two separate frequencies. Thus, oscillator OSC15 applies a tone signal comprising the frequencies A4 and B4 through break contacts 1TN-15 and over paths established through the aforementioned transfer contacts of relays C0015 and 1TR15 to the opened line facilities of the group of telephone stations identified by matrix relay C0015. Similarly, OSCO applied signals frequencies A1 and B1 through break contacts 1TN-0, the break portion of released transfer contacts 1TRO-1, -2, -3, -4, -5, -6, FIG. 2, and the make portion of operated transfer contacts of matrix relay C0000 to the group of line facilities serving the telephone stations identified by relay C0000.

Figure 3:
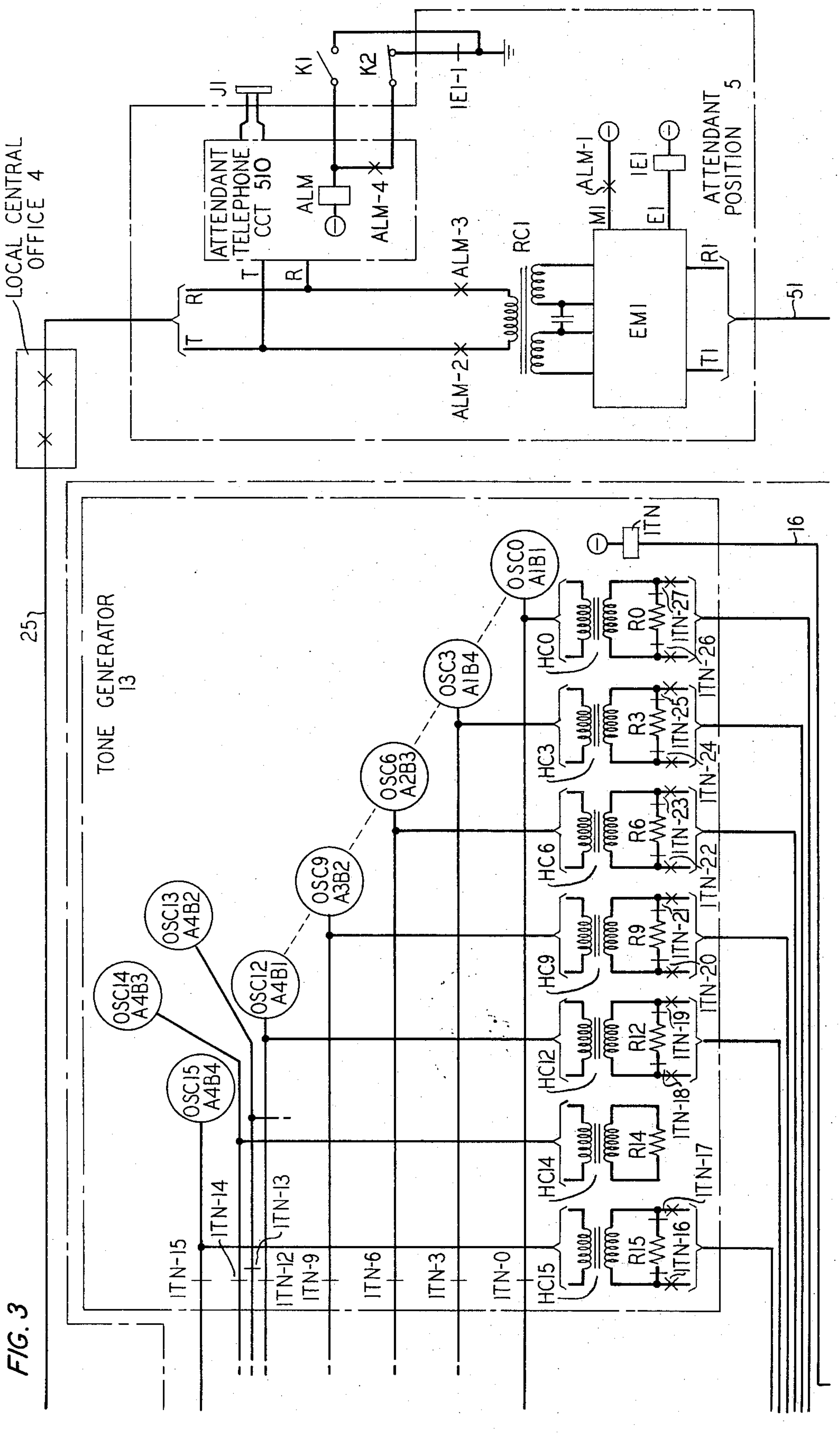

If none of the 96 telephone stations assigned to matrix relays C0000 through C0015 is coupled with called attendant position 5, the train of pulses, FIG. 4, appearing on input T of vertical stepper 111 continues to sequentially operate ones of the vertical stepping relays CP0 through CP19. The operation of vertical stepping relay CP19 applies ground, via make contacts CP19-1, to vertical lead C19 to operate the 16 matrix relays C1900 through C1915, FIG. 2. Operation of relay C1900 enables transfer contacts C1900-3 to momentarily remove calling telephone station 4223 from across its line facilities and, via the break portion of transfer contacts 1TR0-3, apply a burst of tone consisting of signal frequencies A1 and B1 over the opened line facilities toward local central office 2. Signal frequencies A1 and B1 continue over transmission path 25 through tandem switching center 3 and local central office 4, FIG. 3, to called attendant position 5. At called attendant position 5, signal frequencies A1 and B1 received over the T and R conductors of incoming transmission path 25 are applied, via make contacts ALM-2, -3, transformer RC1, and signaling unit EM1, to the T1 and R1 conductors of transmission path 51 for transmission to calling line identifier 1, FIG. 5.

Signal frequencies A1 and B1 received by detector 10 over transmission path 51 are applied through signaling unit EM2 and transformer RC2 to the input of data set 100. Data set 100, in the well-known manner, translates the received A1 and B1 signal frequencies into two ground signals that are simultaneously applied to output leads of conductor 15 to operate relays A1 and B1 of translator 12, FIG. 4. Operation of relays A1 and B1 closes make contacts A1-2 and B1-5 to provide an operate path for the two-out-of-eight check relay ID from ground through make contacts S1-4, B1-5, break contacts B2-5, B3-5, B4-5, make contacts A1-2 and break contacts A2-2, A3-2, and A4-2. The ID relay operates to apply ground through make contacts ID-3 and a lead of conductor 15 to the winding of detector 10 relay ID1, FIG. 5. Relay ID1 operates and closes make contacts ID1-1 to provide an obvious hold path to ground through make contacts 1E2-4 of previously operated relay 1E2. In addition, operation of relay ID1 enables transfer contacts ID1-2 to open the pulsing path of relay P and to hold relay P operated by providing a hold path to ground from the P relay winding through the make portion of transfer contacts ID1-2 and make contacts 1E2-5. With pulsing relay P held operated, ground is applied through operated make contacts P-1 and over a lead of conductor 17 to hold vertical stepping relay CP19, FIG. 4, in the operate state.

A first operation of relays A1 and B1, in combination with the operation of relay ID, prepares a path from ground through make contacts S1-2, break contacts EP-2, make contacts ID-1, A1-1, B1-1, and the break portion of transfer contacts TRO-7 to the winding of relay TRO. Relay TRO thereby operates and locks to a hold ground appearing through make contacts S1-2 and the make portion of the operated transfer contacts TRO-7. Operation of relay TRO signifies the identification of a group of telephone stations wherein the anonymous telephone station coupled with called attendant position 5 is located. The resultant closing of make contacts TRO-1 applies ground over a lead of conductor 14 to operate relay 1TRO of control 11. Relay 1TRO in operating enables transfer contacts 1TRO-1, -2, -3, -4, -5, -6, FIG. 2, to open their respective break contacts and thereby remove the signal frequencies A1 and B1 generated by oscillator OSCO from the group of line facilities assigned to matrix relay C1900.

Data set 100, FIG. 5, responds to the removal of the tone signal previously applied to transmission paths 25 and 51 by releasing relays A1 and B1 of translator 12, FIG. 4. The release of relays A1 and B1, in combination with the operation of relays S1 and TRO, applies ground through make contacts S1-5, TRO-9 and series break contacts B4-6, B3-6, B2-6, B1-6, A4-3, A3-3, A2-3, A1-3 to the winding of end pulse relay EP. Relay EP thereby operates and locks operated through series make contacts EP-1 and S1-5 to ground. The closing of make contacts EP-3 extends ground through make contacts S1-1 to the winding of relay TN. Ground appearing on the winding operates relay TN which then locks operated to a hold ground appearing through make contacts TN-1 and S1-1. Operation of relay TN closes make contacts TN-2 to apply ground over conductor 16 to tone generator 13, FIG. 3.

The ground appearing on conductor 16 operates relay 1TN to open break contacts 1TN-0 through 1TN-15 and operate transfer contacts 1TN-16 through 27. Operation of break contacts 1TN-0 through 1TN-15 prevents ones of the line facilities from being subsequently coupled back to the identified group of line facilities. The operation of transfer contacts 1TN-16 through 1TN-27 removes load resistors R15, R12, R9, R6, R3, R0 from across transformers HC15, HC12, HC9, HC6, HC3, HC0 and connects each output tone of oscillators OSC15, OSC12, OSC9, OSC6, OSC3, and OSC0 through the transformers and the make portion of transfer contacts 1TN-16 through 1TN-27 and 1TRO-6, -5, -4, -3, -2, -1, FIG. 2, respectively, to one of the group of six open line facilities assigned to operated matrix relay C1900. Thus, signal frequencies A2 and B3 of oscillator OSC6, FIG. 3, are applied through hold transformer HC6, transfer make contacts 1TN-22, -23 and the make portion of transfer contacts 1TRO-3 and C1900-3, FIG. 2, to the opened line facilities of calling telephone station 4223. Transformer HC6 prevents the premature release of the switching apparatus of local central office 2 and thereby allows signal frequencies A2 and B3 to be transmitted over the line facilities of calling telephone station 4223 through local central office 2 and over coupled transmission paths 25 and 51 to data set 100, FIG. 5.

Data set 100 responds to receipt of signal frequencies A2 and B3 by placing ground on two leads of conductor 15 to operate relays A2 and B3, FIG. 4. Since relays TRO and EP are operated at this time, the break portion of transfer contacts TRO-7, in combination with open break contacts EP-2, prevents relay TR6 from responding to the operation of the A2 and B3 relays. The resultant closing of make contacts A2-2 and B3-5 provides a path for the ground appearing through make contacts S1-4 to reoperate check relay ID. With the operation of relay ID a path is provided from ground through series make contacts S1-3, ID-2, TN-9, 2CP19-1, TRO-8, A2-4, and B3-7 to code point CP4223 identifying the calling telephone station coupled with called attendant position 5. Code point CP4223 is strapped to the TH4 thousands, H2 hundreds, T2 tens, and U3 units inputs of line identifier translator 121, which is enabled by the ground signal appearing on code point CP4223 to direct display 122 to exhibit directory number 4223 of the calling telephone station. Display 122 may be any one of a plurality of well-known type of apparatus, such as a lamp display, a TELETYPE printer, or tape recorder arranged to record a directory number. The recording of a directory number enables display 122 to operate end of identification relay EI through make contacts S1-6.

The closing of make contacts EI-1 places battery on M2 lead, FIG. 5, to enable signaling unit EM2 in the wellknown manner to direct signaling unit EM1, FIG. 3, of transmission path 51 to ground lead E1. The grounding of lead E1 enables operation of relay 1E1 to open normal contacts 1E1-1 and remove ground from the winding of relay ALM. Relay ALM thereby releases make contacts ALM-2 and ALM-3 to uncouple calling transmission path 25 from transmission path 51. In addition, the opening of make contacts ALM-1 removes battery from lead M1 in order that signaling unit EM1 may direct signaling unit EM2, FIG. 5, to release relay 1E2. The release of relay 1E2 opens make contacts 1E2-1 and 1E2-2 to inhibit further operation of pulser 101 and data set 100, respectively. The release of make contacts 1E2-4 and 1E2-5 removes the holding ground from the windings of relays ID1 and P to allow them to release. Release of pulsing relay P removes ground, formerly applied through make contacts P-1, to the lead of conductor 17 to initiate release of previously operated vertical stepping relay CP19, FIG. 4. The release of relay S1, brought about by the opening of make contacts 1E2-3, opens make contacts S1-1, S1-2, S1-4, S1-5, S1-6, and S1-3 to remove holding grounds from relays TN, TRO, ID, EP, EI and the inputs of line identity translator 112. Release of the apparatus of translator 12 initiates release of control 11 relay 1TRO and tone generator 13, FIG. 3, to restore calling line identifier 1 to the idle state.

In the event the calling telephone station has not been identified within a reasonable time, the attendant may initiate release of calling line identifier 1 by depressing key K2 to release relay ALM.

SUMMARY

It is obvious from the foregoing that the flexibility, economy, and efficiency of identifying telephone stations may be enhanced by the provision of a calling line identification system arranged for identifying a telephone station coupled to a called telephone station over the telephone direct distance dialing network without alerting a calling party that the calling telephone station is being identified. It is further obvious from the foregoing that the aforesaid calling line identification system arrangement for applying bursts of tone signals to momentarily opened groups of line facilities and utilizing received ones of the bursts of tone signals to identify a callng telephone station obviates the need to employ special tracing signals and apparatus for transmitting the special tracing signals between switching offices of the telephone direct distance dialing network.

While the principles of the invention have been described in connection with specific apparatus, it is understood that such an embodiment is intended to be illustrative of the principles of the invention and that numerous other arrangements may be devised by those skilled in the art without departing from the spirit and scope of the invention.

Thus, our invention may be utilized in situations where the calling stations are not all connected through the same local central office 2 but may be spread over a number of local central offices provided that they are all connected to their respective central offices through the calling line identifier 1. In such an embodiment the return trnsmission paths 51 from the different groups of attendants would advantageously be applied to the detector 10 through an appropriate interface circuit which would insure only one return path 51 completes a loop back to the calling line identifier at a time.

Further, our invention is not dependent on the particular path used through the telephone switching network in setting up the connection between the calling station and the called attendant station. Advantageously, the called attendant station may in fact be accessed through an automatic call distributor, as is known in the art, each automatic call distributor having a single return transmission path 51 for completing the loop back to the calling line identifier 1.

What is claimed is:

1. A system for identifying an anonymous one of a plurality of stations each terminating a transmission path connectable through a communication network with a called station comprising means eanbled by the called station for sequentially opening groups of the transmission paths and momentarily applying bursts of distinctive tone signals to each of the opened transmission paths, and means responsive to returned ones of the tone signals for effecting the identify of the anonymous station connected through the communication network with the called station.

2. The identifying system set forth in claim 1 wherein said opening and applying means comprises means for generating a plurality of tone signals each comprised of a coded pair of individual frequency components, means for selectively coupling predetermined ones of the tone signals to each group of the opened transmission paths, and means responsive to the called station for sequentially stepping said coupling means between the groups of the line facilities.

3. The identifying system set forth in claim 2 wherein said effecting means comprises means enabled by a first one of the returned tone signals for directing said coupling means to remove said first returned tone signal from one of the groups of opened transmission paths and individually couple to each opened transmission path thereof second ones of the tone signals, and means enabled by said coupling means in combination with said directing means for identifying the anonymous station from a returned one of the second tone signals.

4. The identifying system set forth in claim 1 further comprising:

means responsive to the called station for interconnecting the transmission path of the anonymous station connected with the called station to said identity effecting means.

5. A system for identifying an anonymous one of a plurality of telephone stations each terminating line facilities connectable through the telephone direct distance dialing network with an incoming line facility of a called telephone station comprising means for generating a plurality of tone signals each comprised of a coded pair of frequency components, means enabled by the called telephone station for sequentially opening groups of the terminating line facilities and simultaneously applying bursts of the tone signals to each of the opened terminating line facilities, and means enabled by the coded pair of frequency components of first and second ones of the bursts of the tone signals appearing on the incoming line facility for effecting the identity of the anonymous telephone station associated with one of the terminating line facilities connected to the incoming line facility of the called telephone station.

6. The identifying system set forth in claim 5 wherein said generating means comprises a plurality of signal generators each arranged to generate simultaneously first and second frequency coded signals.

7. The identifying system set forth in claim 6 wherein said opening and applying means comprises mans common to the groups of terminating line facilities for uncoupling ones of the telephone stations from their associated terminating line facilities, means for enabling said uncoupling means to selectively connect said signal generators to the groups of opened terminating line facilities, and means for controlling said uncoupling means to sequentially select ones of the groups of terminating line facilities.

8. The identifying system set forth in claim 7 wherein said controlling means includes apparatus for pulsing said uncoupling means to momentarily open ones of the groups of terminating line facilities.

9. The identifying system set forth in claim 8 wherein said identity effecting means comprises means connectable to the incoming line facility for detecting ones of the first and second frequency coded signals appearing on the incoming line facility, means enabled by detection of a first one of the first and second frequency coded signals for directing said enabling means to couple predetermined ones of said signal generators to individual ones of the opened terminating line facilities, and means enabled by detection of a second one of the first and second frequency coded signals in combination with said controlling means and said directing means for identifying the anonymous telephone station.

10. The identifying system set forth in claim 9 further comprising communicating means for interconnecting the incoming line facility with said detecting means, and signaling means for enabling the called telephone station to transmit and receive control signals over said communicating means.

11. A system for identifying an anonymous one of a plurality of telephone stations each terminating transmission line facilities selectively connectable through the telephone direct distance dialing network with an incoming attendant telephone circuit of a remote called attendant position comprising means for genrating a plurality of tone signals each comprised of a coded pair of individual frequency components, means for receiving ones of the tone signals designated by the coded pair of frequency components, means for coupling the incoming attendant telephone circuit to said receiving means, means for opening groups of the transmission line facilities and coupling ones of the tone signals to each group of opened transmission line facilities, means responsive to said receiving means for sequentially stepping said opening means between groups of the transmission line facilities, means enabled by said receiving means detecting the coded pair of frequency components of a first one of the tone signals for directing said opening means to uncouple the first tone signal from one of the groups of opened transmission line facilities and couple each opened transmission line facility thereof individually to second ones of the tone signals, and means enabled by said receiving means detecting the coded pair of frequency components of one of the second tone signals for identifying the anonymous telephone station associated with one of the transmission line facilities connected to the incoming attendant telephone circuit.

12. A system for identifying an anonymous one of a plurality of telephone stations each terminating line facilities selectively connectable through a central office of the telephone direct distance dialing network with an incoming attendant line facility of a remote called attendant position comprising a plurality of generators for generating tones comprised of a coded pair of frequency signals, a plurality of first relays each having transfer contacts, the break portions of which are connected in series in ones of the terminating line facilities between one of the telephone stations and the central office and the make portions of which are connected with the ones of the terminating line facilities between the break portions of said transfer contacts and the central office, a plurality of second relays having make contacts and transfer contacts, the break portions of said second relay transfer contacts which are connected in series between ones of said first relay transfer make contacts and a common one of said generators and the make portions of said second relay transfer contacts which are connected in series between the ones of said first relay transfer make contacts and predetermined ones of said generators, a plurality of stepping relays having first make contacts and second make contacts, the first make contacts of which establish an operate path for ones of said first relays, a plurality of coding relays each having first make contacts and second make contacts, the first make contacts of which are connected in series with first make contacts of other coding relays to establish operate paths for predetermined ones of said second relays, detecting apparatus activated by said generators for operating ones of said coding relays in accordance with the coded pair of frequency signals, pulsing apparatus activated by said detecting apparatus for momentarily operating ones of said stepping relays in a predetermined sequence, actuating apparatus responsive to the called attendant position for interconnecting the incoming attendant line facility with said detecting apparatus, and means including said second relay make contacts in series combination with said second make contacts of said stepping relays and said coding relays for effecting an identity of a calling one of the telephone stations connected with the called attendant position.

13. The identifying system set forth in claim 12 further comprising a plurality of holding transformers, the primary windings of which are bridged across said generators and the secondary windings of which are selectively connectable to terminating resistors and between said predetermined ones of said generators and said second relay transfer make contacts.

14. A system for identifying the directory number of an anonymous one of a plurality of telephone stations each terminating line facilities connectable through a telephone switching network to the line facility incoming to a called telephone station comprising signal means for generating a plurality of coded tone signals, relay means connected in series with each of the terminating line facilities for sequentially removing groups of the telephone stations from across their respective line facilities and momentarily applying distinctive ones of the coded tone signals to each opened line facility, and means enabled by first and second ones of the coded tone signals appearing on the incoming line facility of the called telephone station for obtaining the directory number of the anonymous telephone station coupled to the called telephone station.

15. In combination, a calling line identifier for connecting a plurality of calling telephone stations to transmitting line facilities connectable through a telephone switching network to a called telephone station, alarm means at the called telephone station, means responsive to said alarm means for completing a loop from the transmitting line facilities back to the calling line identifier, means in said calling line identifier for generating a plurality of tone signals, means in said calling line identifier responsive to said alarm means for sequentially removing groups of telephone stations from across their respective line facilities and momentarily applying distinctive ones of the tone signals to each opened line facility, and means responsive to first and second ones of said tone signals appearing back on said completed loop at said calling line identifier for obtaining an identification of the particular calling telephone station connected to said called telephone station.

* * * * *